United States Patent [19]

Böschen

[11] 3,955,732
[45] May 11, 1976

[54] LUGGAGE COVER AND RETAINING MEANS

[76] Inventor: Astrid Irma Böschen, Domarevagen 31, 433 00 Partille, Sweden

[22] Filed: Mar. 25, 1974

[21] Appl. No.: 454,783

[52] U.S. Cl. ............................ 224/42.1 E; 296/100
[51] Int. Cl.² .................................................. B60R 9/04
[58] Field of Search ............... 224/42.1 B, 42.1 E, 224/42.1 F, 42.1 R, 29 R; 160/354; 150/52 R; 296/100, 136, 136.1

[56] References Cited
UNITED STATES PATENTS

| 1,090,565 | 3/1914 | Port | 150/52 R |
| 2,305,468 | 12/1942 | Ferrigno | 160/354 |
| 3,316,012 | 4/1967 | Thier | 296/136 |
| 3,615,117 | 10/1971 | Neidlinger | 296/100 |

FOREIGN PATENTS OR APPLICATIONS

| 1,201,381 | 7/1959 | France | 224/42.1 E |

Primary Examiner—Robert J. Spar
Assistant Examiner—Jerold M. Forsberg
Attorney, Agent, or Firm—Toren, McGeady and Stanger

[57] ABSTRACT

A luggage cover to be used in combination with a roof rack on an automobile includes a roof portion and marginal portions extending downwardly therefrom to form a hood. A pliable strengthening member is connected to the underside of the roof portion, and between the latter and the strengthening member longitudinal and transverse channels are formed. In these channels elastic members ending in hooks are fitted for connection to the rack, while the lower hem of the marginal portions forms a peripheral channel for an elastic rope which will pull the lower ends of the marginal portions tight around the rails.

1 Claim, 5 Drawing Figures

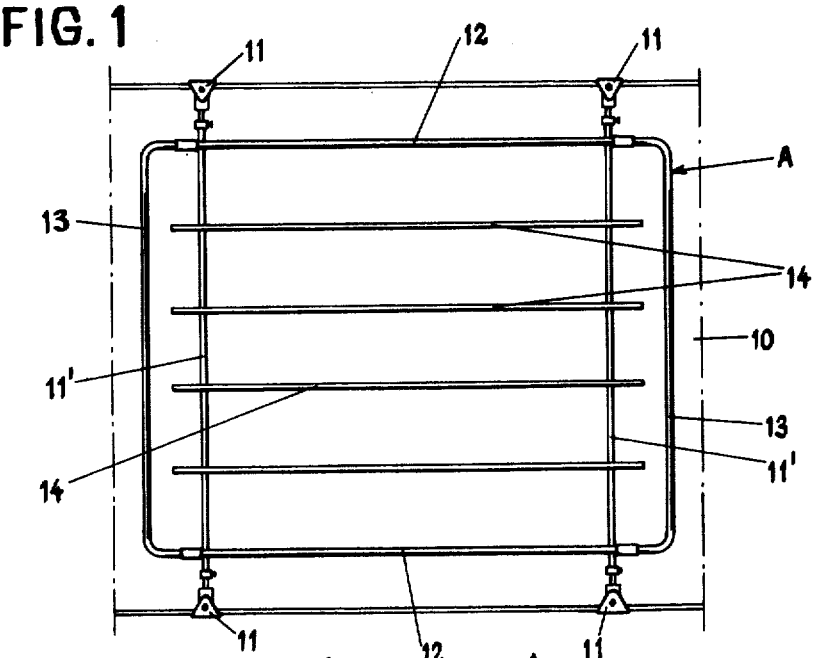
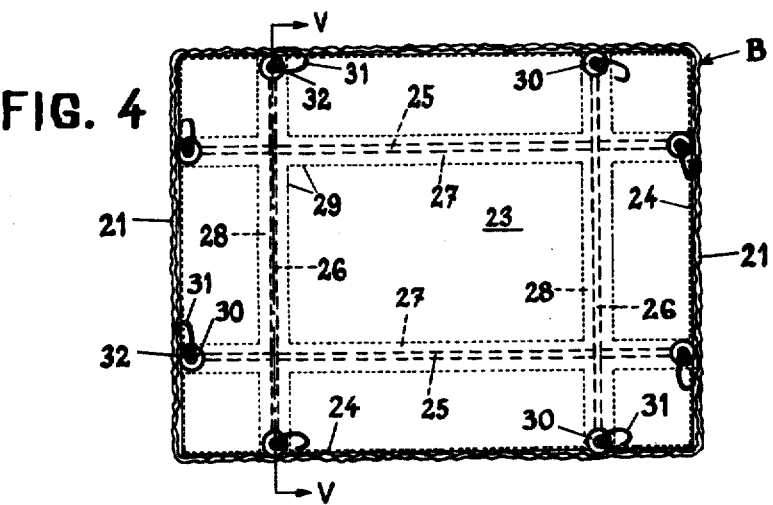

LUGGAGE COVER AND RETAINING MEANS

BACKGROUND OF THE INVENTION

An automobile is often provided with a rack on its roof for carrying luggage. To protect such luggage a tarpaulin is used, which is located by means of elastic bands or ropes. As these bands, or ropes, are separate from the tarpaulin the latter may easily slide off the luggage, or some flap thereof may work free, exposing the luggage. Such free flaps, furthermore, will cause an undesirable noise and they may damage the luggage and/or the roof.

SUMMARY OF THE INVENTION

The present invention refers to a luggage cover and retaining means to be used with automobiles having a quadrilateral roof rack surrounded by a rail and comprises a tarpaulin including a roof portion having substantially the same extension as that of the rack, as well as marginal portions connected to said roof portion to form a hood-shaped unit adapted to enclose the rail of the rack, a pliable internal strengthening member connected to the roof portion in a manner to form together with the same at least one channel extending longitudinally of the tarpaulin and at least one channel transversely thereof, an elastic member having an attachment means at each end in each of the said channels, a peripheral passage running along the edges of the marginal portions remote from the top portion, and means in said passage to pull the marginal portions tight around the rack.

BRIEF DESCRIPTION OF THE DRAWINGS

FIGS. 1 and 2 are a plan view and an elevation, respectively, of a roof luggage rack of a conventional type, FIG. 4 shows the tarpaulin as viewed from below.

DESCRIPTION OF A PREFERRED EMBODIMENT

Figure 3:
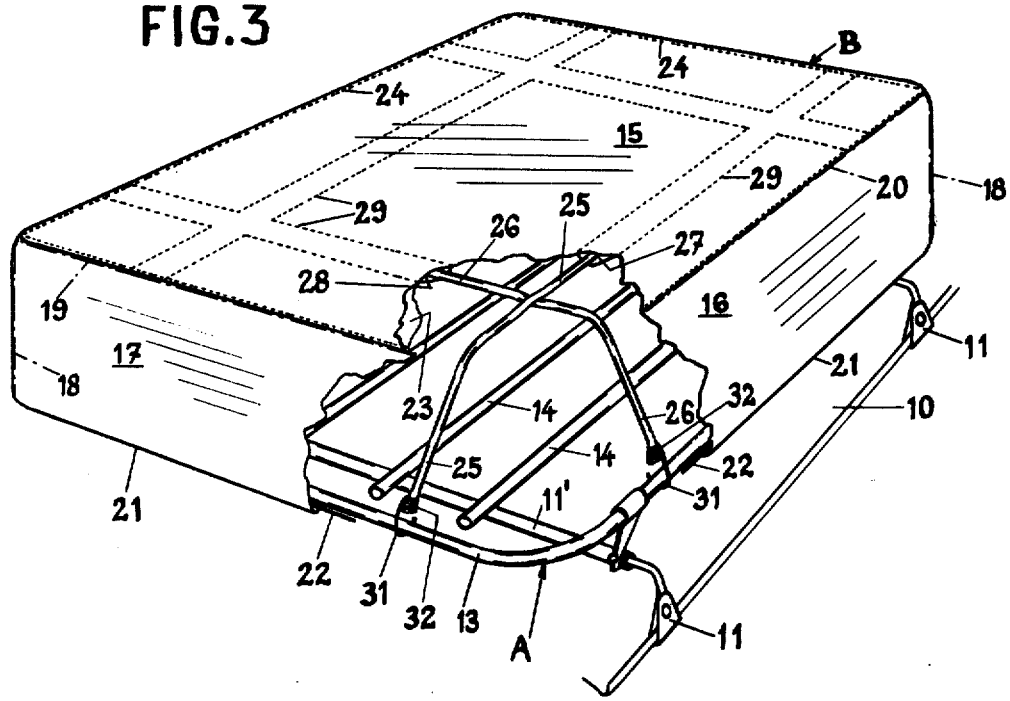
FIG. 3 is a perspective view of the tarpaulin covering the rack, with one corner cut-away, and without any pieces of luggage being shown.
Figure 5:
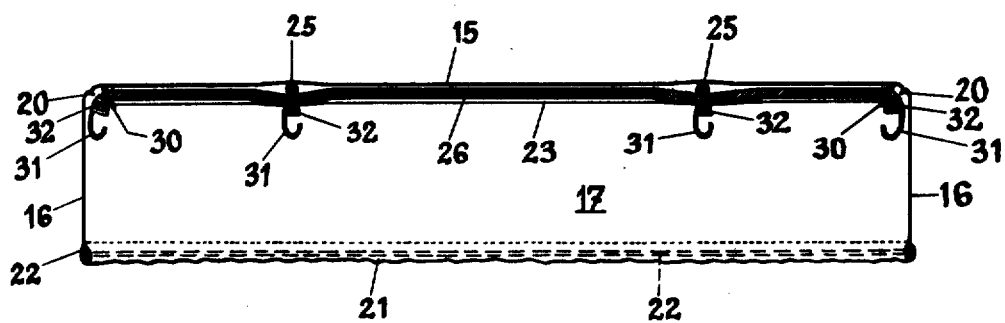
FIG. 5 is a section on an enlarged scale along line V—V of FIG. 4.

In the drawing reference 10 denotes the roof of an automobile, on which a luggage rack, generally denoted by A, is attached in any conventional manner. The rack has a substantially quadrilateral form and includes supports 11 adapted to be attached to the roof and to carry rails formed by rods 12, 12 and 13, 13, which together form a basically rectangular frame with rounded corners, projecting above a trellis formed by rods 14 supported by transverse beams 11'.

The tarpaulin is denoted by B and is made of reinforced plastics or fabric impregnated by synthetic resin. When used the tarpaulin forms a hood including a substantially rectangular roof portion 15 and marginal portions 16, 16 and 17, 17 extending downwardly therefrom. These portions are sewn or welded together along seams 18–20. The lower edges of the marginal portions 16, 17 are provided with a hem forming a peripheral passage 21. In this passage an endless, elastic rope 22 is fitted, the elastic properties of which are used when the mouth of the hood is enlarged to make possible the fitting of the tarpaulin on the rack A to enclose the same as well as possible luggage carried thereby. In fitted position the corner seams 18 will coincide with the rounded corners of the rails.

To the underside of the roof portion 15, the size of which about corresponds to that of the rack, a strengthening member being a piece of fabric 23, preferably of reinforced plastics, or other pliable material, is fitted, which is sewn or welded to the portion along its margins at 24. According to the embodiment shown two spaced, parallel elastic members 25 are fitted longitudinally and two spaced, parallel elastic members 26, are fitted transversely at the roof portion, extending through channels 27 and 28, respectively, formed between the roof portion and the strengthening member. The channels are obtained by the roof portion and the strengthening member being sewn or welded together along suitably located lines. Inside of the edge seams 24, which also close the ends of said channels 27, 28, an opening is made in the strengthening member at the end of each channel. Each opening is reinforced by a washer 30 of plastics or similar material bonded to the strengthening member. Each elastic member 25, 26 is provided with a hook 31 or the like at each end, the attachment of which to the elastic member, in cooperation with the reinforcing washer will prevent the hook from being retracted into the channel. On the drawing the attachment is shown as a helical extension of the hook encircling the end of the elastic member.

When the tarpaulin has been placed upon the luggage the elastic members are stretched and the hooks are connected to suitable points at the luggage rack. Thereafter the marginal portions 16–17 are folded down to bring the hem 21 with the elastic rope 22 down below the rails as shown in FIG. 3. All hooks 31 will in this position be covered by the tarpaulin.

The elastic members 25, 26 will securely retain the luggage upon the rack, as well as the tarpaulin around the luggage. The lower elastic rope 22 will prevent any portion of the tarpaulin from fluttering or from lifting, so the luggage is fully protected. Due to the channels 27, 28 the elastic members 25, 26 will maintain their position with respect to the tarpaulin and will not slip off any individual piece of luggage, while they simultaneously are protected from being caught by external objects, such as low branches of trees or the like.

The number of elastic members will depend upon the size of the rack, and instead of hooks at the ends of the members loops or eyelets may be used. The elastic rope 22 may be substituted by an ordinary open rope, by means of which the hem is tightened and the rope is tied in conventional manner.

When not in use the tarpaulin, together with the elastic members may be folded to a compact bundle.

What I claim is:

1. A luggage cover and retainer for an automobile having a substantially quadrilateral roof rack with a surrounding rail, comprising a tarpaulin having a rectangular roof portion of substantially the same lateral dimensions as that of the rack, said roof portion laterally defined by a pair of oppositely spaced first edges and a pair of oppositely spaced second edges extending transversely between said first edges, said roof portion having a downwardly facing surface arranged to be directed toward the rack and an upwardly facing surface, a marginal portion extending completely around the periphery of the roof portion and connected to the first and second edges of said roof portion and arranged to extend downwardly from the first and second edges to form a hood-shaped unit adapted to enclose the rail of the rack and any luggage thereon, a pliable internal strengthening member of substantially the same rectangular shape and size as said roof portion and attached to the downwardly facing surface side of said roof portion along the first and second sides thereof and to portions thereof inwardly of said first and second edges, the attachment of said strengthening member and said roof portion forms at least one channel therebetween extending between said first edges and at least one channel therebetween extending between said second edges, an annular reinforcing means secured to said strengthening member at each end of said channels, an elastic member positioned within and extending through each of said channels between said means located at the opposite ends of the channel, attachment means for securement to the rack attached to each end of said elastic members outwardly from said reinforcing means at the end of each said channel and said attachment means being shaped relative to said reinforcing means so that said attachment means can not pass through said annular reinforcing means, said marginal portion having a pair of spaced edges extending completely around said roof portion with one said edge connected to said roof portion and the other said edge spaced from said roof portion being hemmed to form a peripheral passage extending for the entire length of said marginal portion around said roof portion, and means in said peripheral passage and extending therethrough for the entire length of said peripheral passage for pulling said marginal portion tight around the rack and any luggage thereon.

* * * * *